US011061625B2

United States Patent
Okayama

(10) Patent No.: US 11,061,625 B2
(45) Date of Patent: Jul. 13, 2021

(54) INFORMATION PROCESSING APPARATUS REQUIRING SELECTIVE USER INTERACTION FOR IMPORT OF SETTINGS, METHOD OF CONTROLLING THE SAME, AND STORAGE MEDIUM

(71) Applicant: CANON KABUSHIKI KAISHA, Tokyo (JP)

(72) Inventor: Noritsugu Okayama, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/156,471

(22) Filed: Oct. 10, 2018

(65) Prior Publication Data
US 2019/0042164 A1 Feb. 7, 2019

Related U.S. Application Data

(63) Continuation of application No. 14/552,716, filed on Nov. 25, 2014, now abandoned.

(30) Foreign Application Priority Data
Nov. 29, 2013 (JP) .................................. 2013-247631

(51) Int. Cl.
*G06F 3/12* (2006.01)
*G06F 9/4401* (2018.01)
(Continued)

(52) U.S. Cl.
CPC ............ *G06F 3/1204* (2013.01); *G06F 3/123* (2013.01); *G06F 3/1285* (2013.01);
(Continued)

(58) Field of Classification Search
None
See application file for complete search history.

(56) References Cited

U.S. PATENT DOCUMENTS 8,019,904 B2 9/2011 Iizuka
9,164,457 B2 10/2015 Machida
(Continued)

FOREIGN PATENT DOCUMENTS

CN 1441352 A 9/2003
CN 102375357 A 3/2012
(Continued)

OTHER PUBLICATIONS

Machine Translation in English of JP Pub 2012-043187 to Yonie O.*

(Continued)

*Primary Examiner* — Haris Sabah
(74) *Attorney, Agent, or Firm* — Rossi, Kimms & McDowell LLP

(57) ABSTRACT

An information processing apparatus that improves user-friendliness in changing settings concerning the control thereof. Settings of the information processing apparatus are classified according to categories, and restart information indicative of whether or not restart of the information processing apparatus is required to cause changes of the settings to take effect is stored on a category-by-category basis. A configuration file for changing the settings is acquired. Before changing the settings based on the configuration file, it is determined based on categories of to-be-changed settings and the restart information whether or not the restart is required to cause the changes in the settings specified in the configuration file to take effect. The results of determination are displayed.

13 Claims, 13 Drawing Sheets

(51) Int. Cl.
*H04N 1/00* (2006.01)
*G06F 21/00* (2013.01)

(52) U.S. Cl.
CPC ............ *G06F 9/4411* (2013.01); *G06F 21/00* (2013.01); *H04N 1/00938* (2013.01); *H04N 1/00962* (2013.01)

(56) References Cited

U.S. PATENT DOCUMENTS

| | | | |
|---|---|---|---|
| 9,253,356 B2* | 2/2016 | Suzuki | .............. G06F 3/1204 |
| 2003/0154323 A1 | 8/2003 | Kujirai | |
| 2005/0141025 A1 | 6/2005 | Hanada | |
| 2006/0170984 A1 | 8/2006 | Matsuda | |
| 2006/0224705 A1 | 10/2006 | Takase | |
| 2008/0002236 A1 | 1/2008 | Inaba | |
| 2008/0147900 A1* | 6/2008 | Iizuka | .............. G03G 15/5075 710/8 |
| 2009/0015867 A1 | 1/2009 | Ukegawa | |
| 2009/0237725 A1 | 9/2009 | Hamaguchi | |
| 2009/0240932 A1* | 9/2009 | Hattori | .............. G06F 8/65 713/1 |
| 2011/0035739 A1 | 2/2011 | Harada | |
| 2013/0086574 A1* | 4/2013 | Yada | .............. G06F 9/44 717/173 |
| 2013/0125107 A1 | 5/2013 | Bandakka et al. | |
| 2013/0215458 A1* | 8/2013 | Machida | .............. H04N 1/00954 358/1.15 |
| 2014/0282480 A1* | 9/2014 | Matthew | .............. G06F 8/60 717/172 |

FOREIGN PATENT DOCUMENTS

| | | |
|---|---|---|
| JP | S5654455 A | 5/1981 |
| JP | 2005242691 * | 9/2005 |
| JP | 2007264805 A | 10/2007 |
| JP | 2008153943 A | 7/2008 |
| JP | 2009225316 A | 10/2009 |
| JP | 2010240909 A | 10/2010 |
| JP | 2011211304 A | 10/2011 |
| JP | 2012043187 A | 3/2012 |
| JP | 2012221201 A | 11/2012 |
| JP | 2012226662 A | 11/2012 |
| JP | 2013149003 A | 8/2013 |

OTHER PUBLICATIONS

Machine Translation in English from Japanese to Suzuki et al., Aug. 6, 2019.*
Machine Translation in English from Japanese to Suzuki et al.*
Office Action issued in Japanese Appln. No. 2018-018373 dated Nov. 6, 2018.
Office Action issued in Chinese Appln. No. 201410713343.2 dated Jun. 2, 2017. English translation provided.
Office Action issued in Japanese Appln. No. 2013-247631 dated Aug. 8, 2017.
Office Action issued in U.S. Appl. No. 14/552,716 dated Aug. 20, 2015.
Office Action issued in U.S. Appl. No. 14/552,716 dated Apr. 1, 2016.
Office Action issued in U.S. Appl. No. 14/552,716 dated Dec. 2, 2016.
Office Action issued in U.S. Appl. No. 14/552,716 dated Jun. 15, 2017.
Office Action issued in U.S. Appl. No. 14/552,716 dated Nov. 22, 2017.
Office Action issued in U.S. Appl. No. 14/552,716 dated Jul. 10, 2018.
Office Action issued in Japanese Appln. No. 2018-018373 dated Feb. 19, 2019.
RATOC Systems, Inc. "Ultra SCSI (FAST-20) Card Bus PC Card REX-CB31 PDF manual." Seventh edition. Mar. 2005: 51-60. Cited in NPL 1. Partial English transition provided.
Toshiba. "Toshiba Tablet Easy Control dynabook R822/T8GS series." Oct. 26, 2012: 1-2. Cited in NPL 1. Partial English translation provided.

* cited by examiner

FIG. 3

| SETTING NAME | DATA CATEGORY | SETTING ID | DATA TYPE | DATA SIZE (bits) | RESTART REQUIRED |
|---|---|---|---|---|---|
| DEVICE NAME | SYSTEM MANAGEMENT SETTINGS | device_name | string | 16 | 0 |
| DEVICE INSTALLATION LOCATION | SYSTEM MANAGEMENT SETTINGS | device_locatoin | string | 16 | 0 |
| POWER SAVING SETTINGS | SYSTEM MANAGEMENT SETTINGS | auto_sleep_time | binary | 40 | 1 |
| DESTINATION 1 | ADDRESS BOOK | address1 | binary | 200 | 0 |
| DESTINATION 2 | ADDRESS BOOK | address2 | binary | 200 | 0 |
| DESTINATION 3 | ADDRESS BOOK | address3 | binary | 200 | 0 |
| USER SETTINGS 1 | FAVORITE SETTINGS | user1_pref_data | binary | 500 | 0 |
| USER SETTINGS 2 | FAVORITE SETTINGS | user2_pref_data | binary | 500 | 0 |
| COPY STANDARD MODE | COPY SETTINGS | default_copy_settings | binary | 60 | 0 |
| FAX RECEPTION MODE | MODEM SETTINGS | fax_receive_mode | u16 | 2 | 0 |
| NCU SETTINGS 1 | MODEM SETTINGS | ncu_prm1 | u16 | 2 | 1 |
| NCU SETTINGS 2 | MODEM SETTINGS | ncu_prm2 | u16 | 2 | 1 |
| PANEL SOUND VOLUME | SOUND VOLUME SETTINGS | volume_settings | binary | 10 | 0 |
| IP ADDRESS SETTINGS | NETWORK SETTINGS | ip_address | binary | 4 | 1 |
| COIN DEVICE MODE | COIN MANAGER SETTINGS | coin_mode | binary | 4 | 1 |
| CARD READER READ SETTINGS | IC CARD READER SETTINGS | ic_card_mode | binary | 4 | 1 |
| DEPARTMENT 1 | DEPARTMENT MANAGEMENT SETTINGS | dep_mng1 | binary | 100 | 0 |
| DEPARTMENT 2 | DEPARTMENT MANAGEMENT SETTINGS | dep_mng2 | binary | 100 | 0 |
| DEPARTMENT 3 | DEPARTMENT MANAGEMENT SETTINGS | dep_mng3 | binary | 100 | 0 |
| ENGINE ELECTROSTATIC VOLTAGE ADJUSTMENT | PRINTER DEVICE SETTINGS | printer_adjust1 | u16 | 2 | 1 |
| ENGINE DENSITY ADJUSTMENT | PRINTER DEVICE SETTINGS | printer_adjust2 | u16 | 2 | 1 |
| DOCUMENT SIZE DETECTION SETTINGS | SCANNER DEVICE SETTINGS | original_detect_settings | u16 | 2 | 1 |
| DOCUMENT FEEDING SPEED CORRECTION | SCANNER DEVICE SETTINGS | scan_v_prm | u16 | 2 | 1 |
| CCD LAMP ADJUSTMENT | SCANNER DEVICE SETTINGS | ccd_lamp_prm | u16 | 2 | 1 |

*FIG. 4*

| DATA CATEGORY | RESTART REQUIRED | IMPORT TIME PERIOD (min.) |
|---|---|---|
| ADDRESS BOOK | 0 | 15 |
| FAVORITE SETTINGS | 0 | 20 |
| SYSTEM MANAGEMENT SETTINGS | 1 | 5 |
| COPY SETTINGS | 0 | 1 |
| MODEM SETTINGS | 1 | 2 |
| SOUND VOLUME SETTINGS | 0 | 1 |
| NETWORK SETTINGS | 1 | 1 |
| COIN MANAGER SETTINGS | 1 | 1 |
| IC CARD READER SETTINGS | 1 | 1 |
| DEPARTMENT MANAGEMENT SETTINGS | 0 | 10 |
| SCANNER DEVICE SETTINGS | 1 | 5 |
| PRINTER DEVICE SETTINGS | 1 | 20 |

FIG. 5

```xml
<?xml version="1.0" encoding="utf-8"?>
<device_configuration>

<data_categories>
<data_category id="ADDRESS BOOK"></data_category>
<data_category id="DEPARTMENT MANAGEMENT SETTINGS"></data_category>
</data_categories>

<address_book_settings>
<address1 size="200" type="binary" >X'77AC695243E4b880E58FB7E6A99F'</address1>
<address2 size="200" type="binary" >X'23C0695243E4b880E58FB7E6A9'</address2>
<address3 size="200" type="binary" >X'E5996952434b880E58FB7E6A9'</address3>
</address_book_settings>

<dept_mng_settings>
<dep_mng1 size="100" type="binary" >X'695243E4b880E58FB7E6A99F'</dep_mng1>
<dep_mng2 size="100" type="binary" >X'695243E4b880E58FB7E6A99F'</dep_mng2>
<dep_mng3 size="100" type="binary" >X'695243E4b880E58FB7E6A99F'</dep_mng3>
</dept_mng_settings>

</device_configuration>
```

FIG. 6

```xml
<?xml version="1.0" encoding="utf-8"?>
<device_configuration>

<data_categories>
<data_category id="SCANNER DEVICE"></data_category>
<data_category id="SYSTEM MANAGEMENT SETTINGS"></data_category>
</data_categories>

<scanner_settings>
<original_detect_settings size="2" type="u16">53</original_detect_settings>
<scan_v_prm size="2" type="u16">32</scan_v_prm>
<ccd_lamp_prms size="2" type="u16">0</ccd_lamp_prm>
</scanner_settings>

<system_mng_settings>
<device_name size="16" type="string" >X'69524388EA8D868B40'</device_name>
<device_location size="16" type="string">X'33328EC08CB18EBA'</device_location>
<auto_sleep_time size="40" type="binary" >X' 99665512452E76BC33F8A0'</auto_sleep_time>
</system_mng_settings>

</device_configuration>
```

*FIG. 7*

```
<?xml version="1.0" encoding="utf-8" ?>
<device_configuration>

<system_mng_settings>
<device_name size="16" type="string" >X'69524388EA8D8868B40'</device_name>
<device_location size="16" type="string" >X'33328EC08CB18EBA'</device_location>
<auto_sleep_time size="40" type="binary" >X' 2E76BC33F8A0'</auto_sleep_time>
</system_mng_settings>

</device_configuration>
```

INFORMATION PROCESSING APPARATUS REQUIRING SELECTIVE USER INTERACTION FOR IMPORT OF SETTINGS, METHOD OF CONTROLLING THE SAME, AND STORAGE MEDIUM

BACKGROUND OF THE INVENTION

Field of the Invention

The present invention relates to an information processing apparatus capable of changing settings thereof, a method of controlling the same, and a storage medium.

Description of the Related Art

In a recent image forming apparatus, the number of setting items editable by a user are increased according to improvement in the function of the image forming apparatus. As a technique for simplifying registration of settings of a series of setting items, an import function or an export function has come to be provided which makes it possible to take out configuration data indicative of settings of an image forming apparatus to an external device, and register the configuration data in another image forming apparatus of the same type or in an image forming apparatus of a different type.

Further, there has been proposed a technique in which when installing an application operable by the image forming apparatus, the frequency of restarting the image forming apparatus is reduced to thereby increase the possibility of continuing the operation of the apparatus (see e.g. Japanese Patent Laid-Open Publication No. 2012-221201).

However, the technique disclosed in Japanese Patent Laid-Open Publication No. 2012-221201 concerns the update of the application that operates in the image forming apparatus, and hence there is no mentioning about a technique concerning the import of configuration data.

Further, with the technique disclosed in Japanese Patent Laid-Open Publication No. 2012-221201, it is impossible to continue the operation of the image forming apparatus, without restarting the image forming apparatus after importing the configuration data. Furthermore, it is impossible to notify the user of whether or not the restart is required, before or during the import of the configuration data.

SUMMARY OF THE INVENTION

The present invention provides an information processing apparatus that improves user-friendliness in changing settings concerning the control of the information processing apparatus, a method of controlling the same, and a storage medium.

In a first aspect of the present invention, there is provided an information processing apparatus that is capable of changing settings thereof, comprising a storage unit configured to classify settings of the information processing apparatus according to categories, and store restart information indicative of whether or not restart of the information processing apparatus is required in order to cause changes of the settings to take effect, on a category-by-category basis, an acquisition unit configured to acquire a configuration file for changing the settings of the information processing apparatus, a determination unit configured to determine, before changing the settings of the information processing apparatus based on the configuration file, whether or not the restart of the information processing apparatus is required in order to cause changes of to-be-changed settings specified in the configuration file to take effect, based on categories of the to-be-changed settings and the restart information, and a display unit configured to display results of determination by the determination unit.

In a second aspect of the present invention, there is provided a method of controlling an information processing apparatus that is capable of changing settings thereof, comprising classifying settings of the information processing apparatus according to categories, and storing restart information indicative of whether or not restart of the information processing apparatus is required in order to cause changes of the settings to take effect, on a category-by-category basis, acquiring a configuration file for changing the settings of the information processing apparatus, determining, before changing the settings of the information processing apparatus based on the configuration file, whether or not the restart of the information processing apparatus is required in order to cause changes of to-be-changed settings specified in the configuration file to take effect, based on categories of the to-be-changed settings and the restart information, and displaying results of determination by said determining.

In a third aspect of the present invention, there is provided a non-transitory computer-readable storage medium storing a computer-executable program for executing a method of controlling an information processing apparatus that is capable of changing settings thereof, wherein the method comprises classifying settings of the information processing apparatus according to categories, and storing restart information indicative of whether or not restart of the information processing apparatus is required in order to cause changes of the settings to take effect, on a category-by-category basis, acquiring a configuration file for changing the settings of the information processing apparatus, determining, before changing the settings of the information processing apparatus based on the configuration file, whether or not the restart of the information processing apparatus is required in order to cause changes of to-be-changed settings specified in the configuration file to take effect, based on categories of the to-be-changed settings and the restart information, and displaying results of determination by said determining.

According to the present invention, when it is determined that a category shown in a device configuration file is a category in which the restart of the information processing apparatus is required, a notification that the change of settings requires the restart of the information processing apparatus is displayed on a display section, and when the user has instructed to change the settings via a console section, the settings are changed. This makes it possible to notify the user that it is necessary to perform the restart of the apparatus beforehand, and therefore it is possible to improve user-friendliness in changing the settings.

Further features of the present invention will become apparent from the following description of exemplary embodiments (with reference to the attached drawings).

BRIEF DESCRIPTION OF THE DRAWINGS

FIG. 3 is a diagram of an example of settings management information stored in an HDD shown in FIG. 2.

FIG. 4 is a diagram of an example of data category information stored in the HDD shown in FIG. 2.

FIG. 5 is a diagram of an example of a device configuration file showing settings to be changed.

FIG. 6 is a diagram of another example of the device configuration file showing settings to be changed.

FIG. 7 is a diagram of another example of the device configuration file showing settings to be changed.

DESCRIPTION OF THE EMBODIMENTS

The present invention will now be described in detail below with reference to the accompanying drawings showing embodiments thereof.

Figure 1:
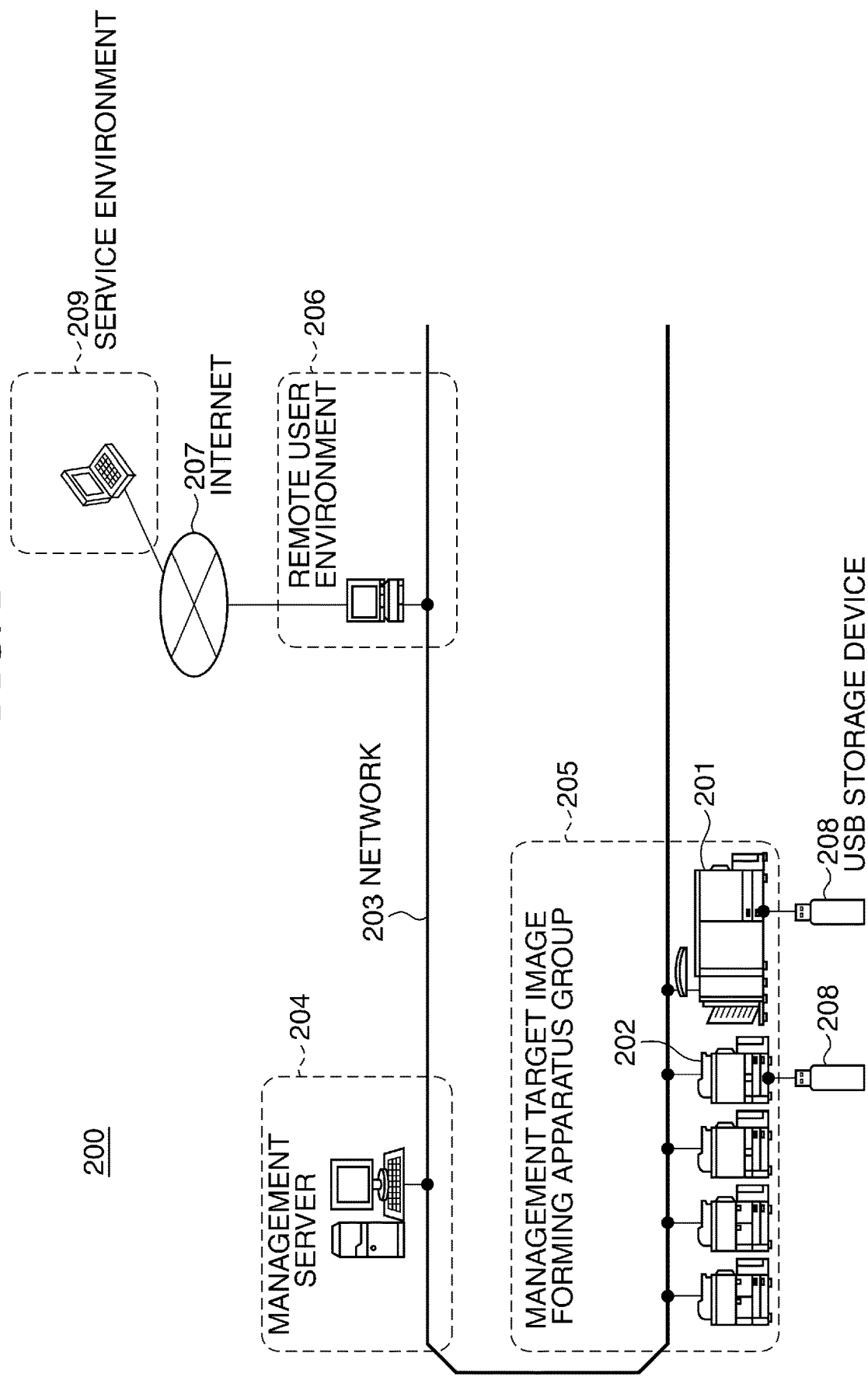
FIG. 1 is a schematic diagram of a system including an image forming apparatus according to an embodiment of the present invention.

FIG. 1 is a schematic diagram of a system 200 including an image forming apparatus 201 as an information processing apparatus according to an embodiment of the present invention.

Referring to FIG. 1, the system 200 is comprised of a management target image forming apparatus group 205, a management server 204, a remote user environment 206, and a service environment 209.

Out of these, the management target image forming apparatus group 205, the management server 204, and the remote user environment 206 are connected to a network 203, and the remote user environment 206 and the service environment 209 are connected to the Internet 207.

The management target image forming apparatus group 205 is formed by a plurality of image forming apparatuses including the image forming apparatus 201 according to the present embodiment, an image forming apparatus 202, and so forth.

Particularly, the image forming apparatuses 201 and 202 are capable of reading originals, performing image processing on image data read from the originals, and outputting the processed image data. Further, they are also capable of receiving image data processed by the other apparatuses and PDL (Page Description Language) data generated by a client computer, via the network 203, and printing the image data and the PDL data.

Further, the image forming apparatuses 201 and 202 are also capable of transmitting read image data to various apparatuses, such as a file server and a mail server, via the network 203.

The management server 204 performs communication with each image forming apparatus included in the management target image forming apparatus group 205 via the network 203 in order to export and import settings concerning the control of the image forming apparatus.

For this communication, known protocols, such as HTTP (Hyper Text Transfer Protocol), SOAP (Simple Object Access Protocol), and FTP (File Transfer Protocol), are used.

The remote user environment 206 is operated by the service environment 209. Through this operation, it is made possible to export and import the settings for controlling each image forming apparatus included in the management target image forming apparatus group 205.

The above import and export can also be performed by directly connecting a USB storage device 208, referred to hereinafter, to each image forming apparatuses.

Although in the following description, out of the image forming apparatuses of the management target image forming apparatus group 205, the image forming apparatus 201 will be described as an image forming apparatus to be managed, by way of example, the present invention is also applied to the image forming apparatuses other than the image forming apparatus 201.

Figure 2:
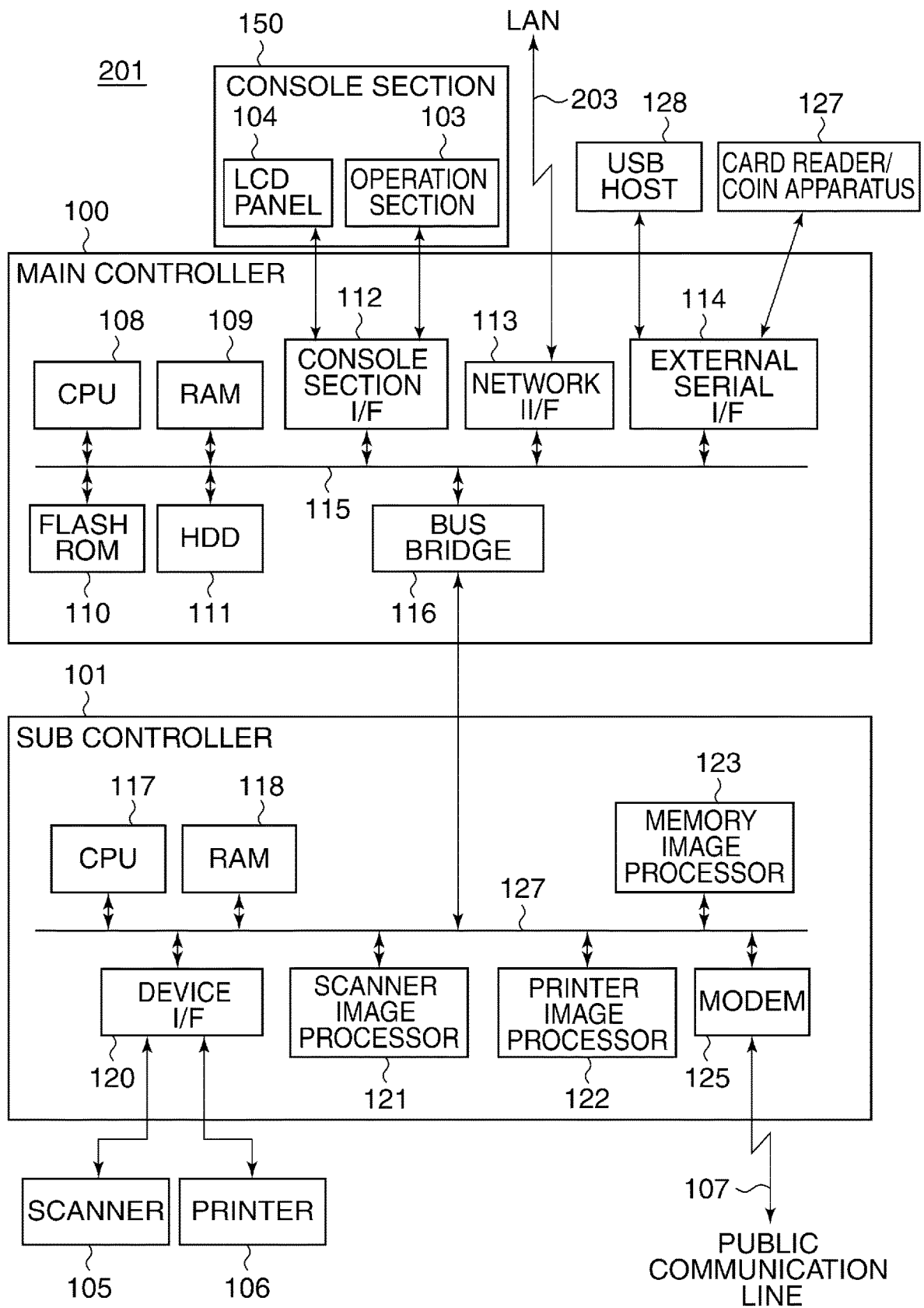
FIG. 2 is a schematic diagram of the image forming apparatus shown in FIG. 1.

FIG. 2 is a schematic diagram of the image forming apparatus 201 shown in FIG. 1.

Referring to FIG. 2, the image forming apparatus 201 includes a main controller 100 and a sub controller 101.

The main controller 100 is comprised of a CPU 108, a RAM 109, a console section interface 112, a network interface 113, an external serial interface 114, a flash ROM 110, an HDD (hard disk drive) 111, and a bus bridge 116, which are connected to each other by a system bus 115.

Further, the main controller 100 is connected to an LCD (liquid crystal display) panel 104 which is a display section for displaying information for a user, an operation section 103 comprised of operation buttons and a touch panel for receiving an operation input by the user, a USB host 128, and a card reader/coin apparatus 127. The LCD panel 104 and the operation section 103 form a console section 150.

The CPU 108 executes various programs stored in the flash ROM 110 and the HDD 111 and loaded into the RAM 109, to thereby control the overall operation of the image forming apparatus 201.

The RAM 109 has programs and data stored therein, and is used as a work area for the CPU 108. The console section interface 112 provides an interface between the LCD panel 104 and the operation section 103, and the main controller 100. The console section interface 112 displays an image on the LCD panel 104, and transmits information input from the operation section 103 to the CPU 108.

The network interface 113 provides an interface with the network 203. The external serial interface 114 provides an interface between the USB host 128 and the card reader/coin apparatus 127, and the main controller 100.

The flash ROM 110 and the HDD 111 are nonvolatile storage devices, and store, in addition to various programs, image data and data of settings (configuration data) imported into or exported from the image forming apparatuses. Further, settings management information and data category information, referred to hereinafter, are stored in the HDD 111 which corresponds to a storage unit.

The bus bridge 116 connects between the main controller 100 and the sub controller 101.

Next, a description will be given of the sub controller 101. The sub controller 101 is comprised of a CPU 117, a RAM 118, a memory image processor 123, a device interface 120, a scanner image processor 121, a printer image processor 122, and a modem 125, and is connected to a scanner 105 and a printer 106.

The CPU 117 controls the overall operation of the sub controller 101. Image data obtained by the scanner 105, image data to be printed by the printer 106, and image data stored in the flash ROM 110 and the HDD 111 are loaded into the RAM 118 so as to be processed by the CPU 117.

The device interface 120 provides an interface between the scanner 105 and the printer 106, and the sub controller 101. Control signals, image data, and the like are exchanged between the scanner 105 and the printer 106, and the CPU 117, via the device interface 120.

The scanner image processor 121 performs various kinds of processing, such as color space conversion, movement, color adjustment, density control, and delay amount control, on image data obtained by the scanner 105. The printer image processor 122 performs various kinds of processing, such as color space conversion, movement, color adjustment, density control, and delay amount control, on image data to be printed by the printer 106.

The memory image processor 123 performs image processing, such as rotation, scaling, color space conversion, gray scale transformation, synthesis, encoding, and decoding, on image data stored in the RAM 118.

The modem 125 incorporates an NCU (Network Control Unit), and is connected to a public communication line 107 to perform modulation and demodulation of FAX image data which is to be transmitted or has been received.

FIG. 3 is a diagram of an example of the settings management information stored in the HDD 111 shown in FIG. 2.

In FIG. 3, the settings management information is stored as data of a device settings database 315, referred to hereinafter, and is composed of the items of "setting name", "data category", "setting ID", "data type", "data size (bits)", and "restart required".

Out of these, the "setting name" indicates the name of each setting. The "data category" indicates a category to which each setting belongs. The "setting ID" indicates an ID assigned to each setting. The "data type" indicates an expression of each setting, such as character string or binary. The "data size (bits)" indicates a size (in units of bits) assigned to data of each setting. The "restart required" is associated with other restart information, and indicates whether or not the restart of the image forming apparatus 201 is required when an associated one of the settings has been changed. If the restart of the image forming apparatus 201 is required, it is indicated by 1, and if the restart of the image forming apparatus 201 is not required, it is indicated by 0.

Next, a description will be given of the restart of the image forming apparatus 201. Hardware constituting the image forming apparatus 201 includes hardware required to be reset when settings concerning thereon have been changed, and hardware on which changed settings come to take effect only at the start of the image forming apparatus 201, due to the characteristics of the hardware.

When the settings of such hardware have been changed, it is required to restart the image forming apparatus 201, so that the item of "restart required" is included in the above-described settings management information.

Further, in the above-mentioned data category, e.g. a category of "scanner device settings" is a category of settings concerning the control of the scanner 105, and a category of "printer device settings" is a category of settings concerning the control of the printer 106. Further, a category of "modem settings" is a category of settings concerning the control of the modem 125.

Further, a category of "coin manager settings" and a category of "IC card reader settings" are categories of settings concerning the control of the card reader/coin apparatus 127, respectively. A category of "network settings" is a category of settings concerning the control of the network interface 113.

Note that in the present embodiment, the restart required flag is set to 1 for all the settings in the category of "printer device settings", and hence the restart of the image forming apparatus 201 is required after any of these settings has been changed. However, combinations of settings requiring the restart of the image forming apparatus 201 are not limited to specific categories.

Further, although in the present embodiment, information of a data category is embedded in the settings management information, the information of a data category may be included in data or commands other than the settings management information.

As described above, in the settings management information, each setting is provided with other restart information indicative of whether or not the restart of the image forming apparatus 201 is required when the setting has been changed.

FIG. 4 is a diagram of an example of the data category information stored in the HDD 111 shown in FIG. 2.

In FIG. 4, the data category information is stored as data of the device settings database 315 together with the above-described settings management information, and is composed of the items of "data category", "restart required", and "import time period".

Out of these, the "data category" and the "restart required" have the same meanings as those of the "data category" and the "restart required" of the above-described settings management information. However, the "restart required" is restart information indicating whether or not the restart of the image forming apparatus 201 is required when a setting belonging to an associated one of the categories has been changed. If out of settings included in the associated "data category", at least one setting includes the "restart required" set to 1, the "restart required" for the data category is set to 1.

Further, the "import time period" represents a result of counting a time period to be taken to import a setting belonging to each data category in units of minutes, using standard import data, and varies with the throughput of the image forming apparatus 201, the kind of settings supported by the image forming apparatus, and the number of settings.

As described above, in the data category information, settings are classified into the categories, and there is provided, on a category-by-category basis, restart information indicative of whether or not the restart of the image forming apparatus 201 is required when a setting belonging to a category is changed. Further, the data category information further includes a time period to be taken to change the settings belonging to each category, on a category-by-category basis.

FIGS. 5 to 7 are diagrams of examples of a device configuration file showing settings to be changed.

Import data imported into the image forming apparatus 201 and export data exported from the image forming apparatus 201 are in a common format. The device configuration files shown in FIGS. 5 to 7 show examples of the import and export data items.

In FIGS. 5 to 7, the device configuration files are expressed in XML (Extensible Markup Language) format, such that data categories and setting IDs can be determined by tags, and data types, settings, etc. are expressed therein. Further, these device configuration files are received by the image forming apparatus 201 generally in a compressed state.

Next, a description will be given of the restart of the image forming apparatus 201 in cases where the above device configuration files have been received. For example, in the device configuration file shown in FIG. 5, the data categories of settings included in the device configuration file can be obtained from "data_category id" within "data_categories" tags.

Then, in the data category information shown in FIG. 4, by referring to "restart required" associated with each data category obtained from the FIG. 5 device configuration file, it is possible to determine whether or not the restart of the image forming apparatus 201 is required after the device configuration file have been imported.

Fox example, in the FIG. 5 device configuration file, data categories are "address book" and "department management settings". In the data category information shown in FIG. 4, "restart required" associated with each of these data categories is equal to 0, and hence the restart of the image forming apparatus 201 after the FIG. 5 device configuration file have been imported is not required.

On the other hand, in the FIG. 6 device configuration file, the data categories are "scanner device settings" and "system management settings". In the data category information shown in FIG. 4, "restart required" associated with each of these data categories is equal to 1, and hence the restart of the image forming apparatus 201 after the FIG. 6 device configuration file have been imported is required.

Further, when no data categories are shown in a device configuration file as in the FIG. 7 device configuration file, it is not known whether or not the restart of the image forming apparatus 201 is required.

Note that even when whether or not the restart is required is not known before a device configuration file is imported, the same is determined during import of the device configuration file. Specifically, e.g. in a case where a setting of a setting ID "auto_sleep_time" of the FIG. 7 device configuration file is imported, it is determined that the restart the image forming apparatus 201 is required, since "restart required" associated with this setting ID in the settings management information is set to 1.

Further, as to the "import time period", e.g. in the FIG. 5 device configuration file, the data categories are "address book" and "department management settings". In the data category information shown in FIG. 4, import time periods associated with the respective data categories are "15" and "10", respectively, and hence the import time period to be taken to complete the import of the FIG. 5 device configuration file is 25 minutes, which is the total sum of those import time periods.

On the other hand, in the FIG. 6 device configuration file, the data categories are "scanner device settings" and "system management settings". In the data category information shown in FIG. 4, import time periods associated with the respective data categories are "5" and "5", and hence the import time period to be taken to complete the import of the FIG. 6 device configuration file is 10 minutes, which is the total sum of the import time periods.

Figure 8:
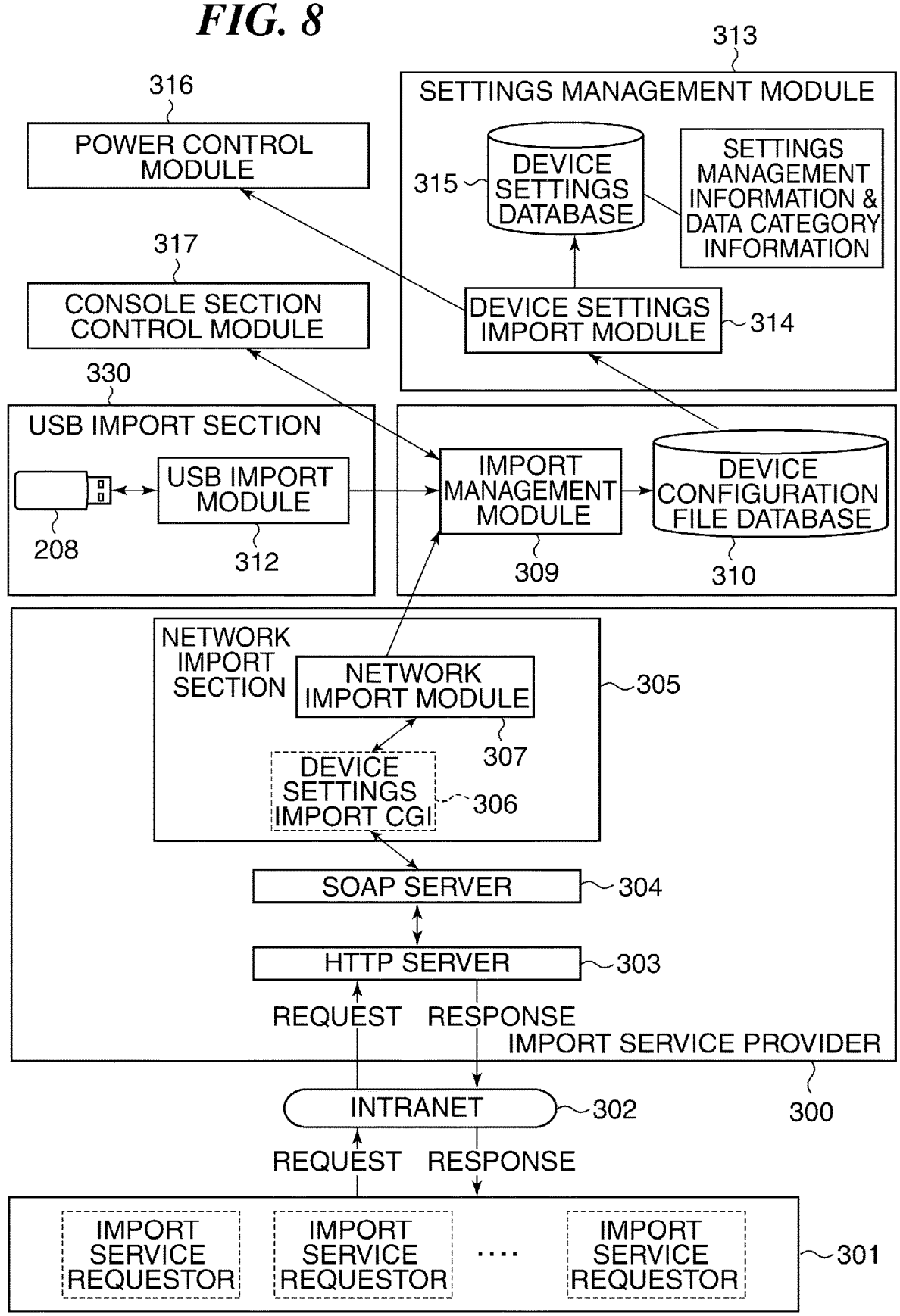
FIG. 8 is a schematic diagram of an import/export service in the FIG. 1 image forming apparatus.

FIG. 8 is a schematic diagram of an import/export service in the FIG. 1 image forming apparatus 201.

Referring to FIG. 8, an import process and an export process will be described in the mentioned order. In the import process performed by the image forming apparatus 201 in a case where the apparatus imports a device configuration file received via the network 203 (hereafter referred to as the network import process), an import service requestor 301 is a transmitter of the device configuration file, and an import service provider 300 is a receiver of the device configuration file.

The import service requestor 301 and the import service provider 300 communicate with each other using a SOAP message via an intranet 302.

After an HTTP server 303 and a SOAP server 304 interpret a request message, in a network import section 305, a device settings import CGI 306 is started for executing processing requested by the request message.

Further, in accordance with the request message, the SOAP server 304 causes the device settings import CGI 306 to started. The started device settings import CGI 306 causes a network import module 307 of the network import section 305 to primarily store the received device configuration file in a temporary area of the HDD 111.

As described hereinabove, this device configuration file is a compressed collection of the plurality of XML files shown in FIGS. 5 to 7 by way of example.

After primarily storing the received device configuration file, the network import module 307 requests an import management module 309 to perform secondary storage. The import management module 309 reads compressed data from the temporary area, and decompresses the data.

After decompression of the compressed data, the import management module 309 initializes a device configuration file database 310. After initialization of the device configuration file database 310, the import management module 309 registers the setting IDs described with reference to FIG. 3 in the device configuration file database 310, by parsing the acquired XML files.

In doing this, the import management module 309 determines data categories of settings described in the XML files, and determines how long it will take to import the XML files and whether or not the restart of the image forming apparatus 201 is required to be performed after importing the XML files, so as to cause the settings to take effect.

The import management module 309 requests a device settings import module 314 of a settings management module 313 to perform tertiary storage. Upon receipt of the request, the device settings import module 314 acquires settings matching setting IDs indicating data to be processed, from the device configuration file database 310 secondarily stored, and registers the settings in the device settings database 315.

This device settings database 315 is composed of the settings management information described with reference to FIG. 3 and the data category information described with reference to FIG. 4. Although in the present embodiment, data categories are included in a device configuration file, the data categories may be included in import data or a communication command transmitted from the import service requestor 301 to the import service provider 300. Further, the data category information shown in FIG. 4 is configured to be capable of being referred to from other modules via the device settings import module 314.

As described above, some settings require the restart of the image forming apparatus 201 when they are changed, so that if a setting requiring the restart of the image forming apparatus is registered in the device settings database 315 by the tertiary storage, a power control module 316 is notified that it is necessary to restart the image forming apparatus 201.

In the present embodiment, the device settings import module 314 reads settings from the device configuration file database 310 one by one, and registers the settings in the device settings database 315. This completes the network import process for importing the contents of the device configuration file which the image forming apparatus 201 has received via the network 203.

Next, an import process for importing settings from the USB storage device will be briefly described. A USB import module 312 of a USB import section 330 performs the import process on behalf of the network import module 307 of the network import section 305 so as to import settings from the USB storage device 208 of the USB import section 330.

The USB import module 312 detects that the device configuration file is stored in the USB storage device 208. After storing the device configuration file in the temporary area, the USB import module 312 requests the import management module 309 to perform secondary storage. The details of the subsequent import process are the same as those of the network import process.

Next, a description will be given of the export process. In the export process performed by the image forming apparatus 201 for exporting a device configuration file requested via the network 203 (hereafter referred to as the network export process), the import service requestor 301 receives the device configuration file, and the import service provider 300 transmits the device configuration file.

Upon receipt of an export request via the intranet 302, the import service provider 300 requests the import management module 309 to create an export file.

Upon receipt of the request for creating the export file, the import management module 309 requests an export module, not shown, to store settings to be exported, in the device configuration file database 310.

When the import management module 309 receives from the export module a notification to the effect that the storage of the settings to be exported in the device configuration file database 310 has been completed, the import management module 309 creates a device configuration file in the temporary area.

When the import management module 309 completes compression of the device configuration file, an export requester, i.e. the aforementioned import service requester 301 is notified via the import service provider 300 and the intranet 302 that the creation of the device configuration file has been completed.

After that, when the device configuration file is requested via the intranet 302, the import service provider 300 sends the created device configuration file to the export requester. With this, the image forming apparatus 201 completes the export process for exporting the device configuration file requested via the network 203.

Next, an export process for exporting settings to the USB storage will be briefly described. When it is detected by a console section control module 317 that an operation making an export request is performed on the operation section 103, the import management module 309 starts the export process. The details of the export process from this to completion of compression of the device configuration file by the import management module 309 are the same as those of the network export process.

Then, upon receipt of a notification that creation of the device configuration file has been completed, the USB import module 312 requests the import management module 309 to send the device configuration file.

The USB import module 312 stores the obtained device configuration file in the USB storage.

As described hereinabove, in the present embodiment, the import process and the export process are controlled by common modules, such as the import service provider 300 and the import management module 309. However, the import process and the export process may be separately controlled by different modules.

Further, although in the present embodiment, the secondary storage into the device configuration file database 310 is performed, settings may be directly registered in the device settings database 315 without performing the secondary storage.

The secondary storage is performed for filtering off settings which are not supported by the image forming apparatus 201, using the device settings import module 314, by taking it into account that different settings are supported by different image forming apparatuses.

Next, a description will be given of an example of a screen displayed on the LCD panel 104 in the present embodiment.

FIGS. 9A to 11C are diagrams of examples of the screen displayed on the LCD panel 104 shown in FIG. 2.

Each of the screens shown in FIGS. 9A to 11C is created by the console section control module 317.

Figure 9A:
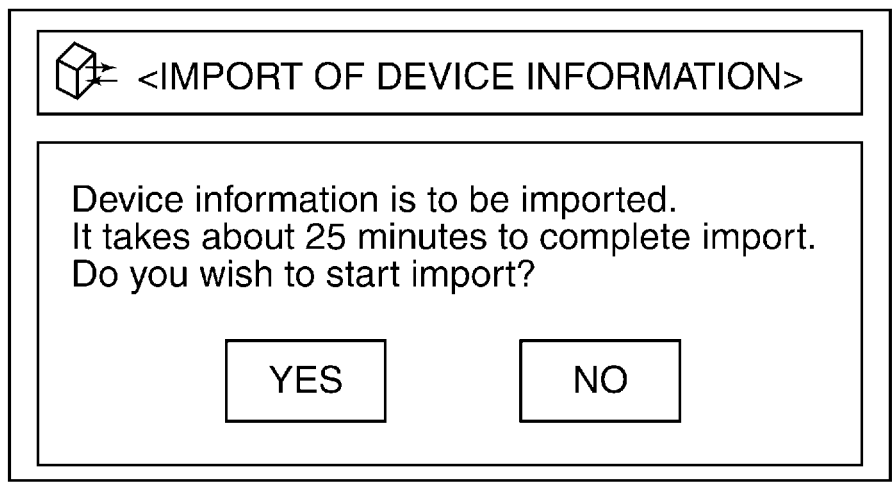
FIGS. 9A and 9B are diagrams of examples of a screen displayed on an LCD panel shown in FIG. 2.

FIG. 9A shows a screen displayed when import is started which does not require the restart of the image forming apparatus.

On the FIG. 9A screen, the user can select whether or not to start importing device information, which is a device configuration file, by pressing a "YES" button or a "NO" button on a touch panel. Further, FIG. 9A shows that it takes approximately 25 minutes to import the device information. As described above, in the present embodiment, the total sum of time periods indicated by category information associated with categories shown in the device configuration file is displayed on the LCD panel 104.

Figure 9B:
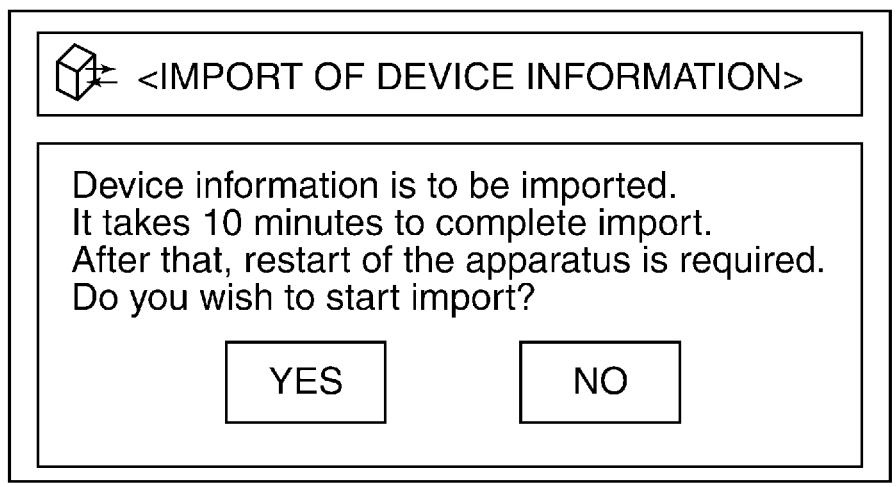

FIG. 9B shows a screen displayed before starting import which requires the restart of the image forming apparatus. The FIG. 9B screen shows that the restart of the image forming apparatus is required, in addition to the information shown in FIG. 9A.

Figure 10A:
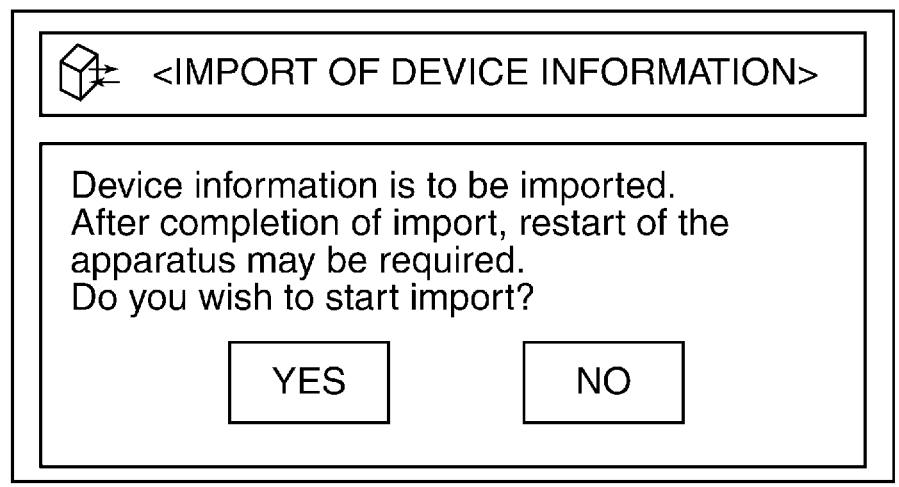
FIGS. 10A and 10B are diagrams of other examples of the screen displayed on the LCD panel shown in FIG. 2.

FIG. 10A shows a screen displayed before starting import which has the possibility of requiring the restart of the image forming apparatus.

As described hereinabove, when no data categories are shown in a device configuration file, it is not known whether or not the restart of the image forming apparatus is required. The FIG. 10A screen is displayed when such a device configuration file is to be imported.

Figure 10B:
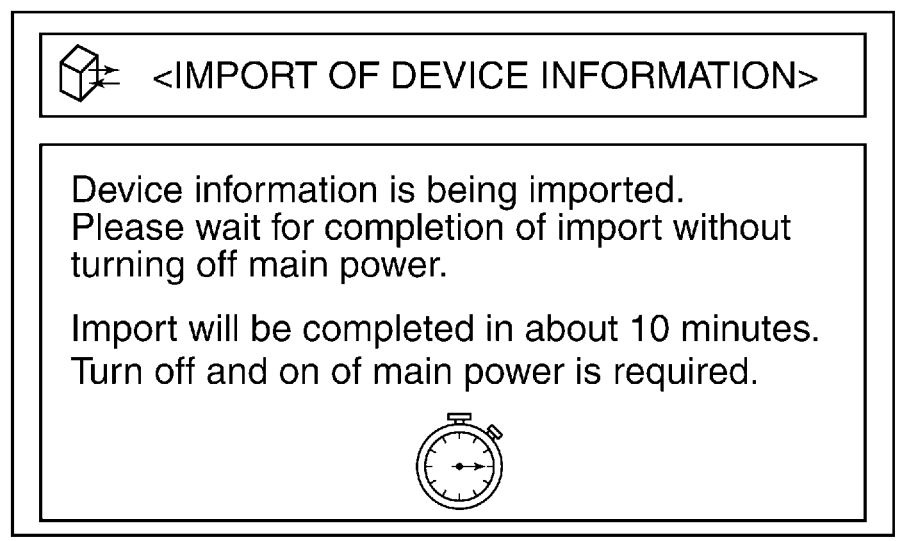

FIG. 10B shows a screen displayed during import. FIG. 10B shows that device information is being imported. Further, since this import requires the restart of the image forming apparatus 201, it is also shown that the main power of the image forming apparatus 201 is required to be turned off and on again.

Figure 11A:
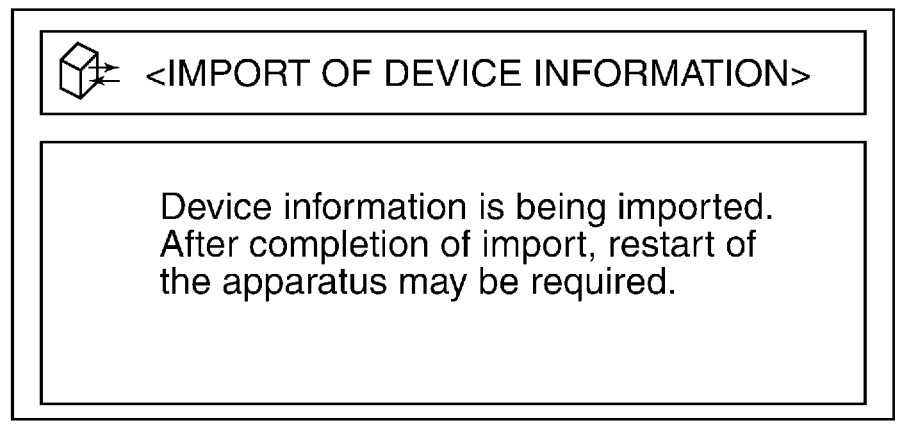
FIGS. 11A to 11C are diagrams of other examples of the screen displayed on the LCD panel shown in FIG. 2.
Figure 11B:
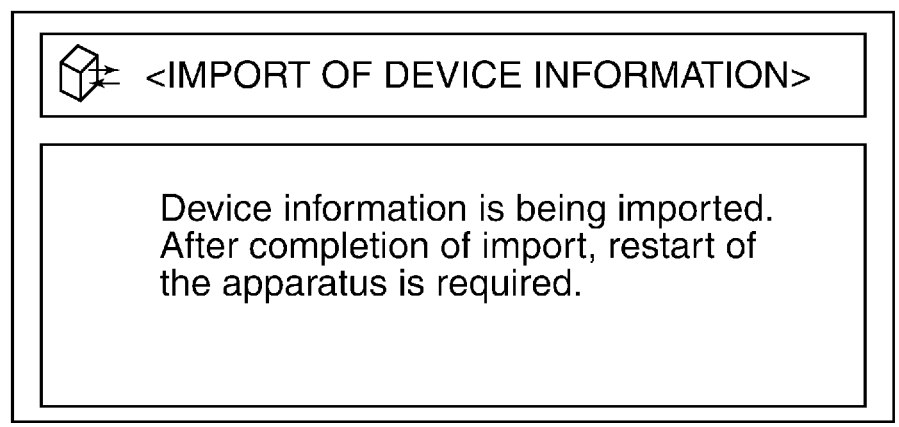

FIG. 11A shows a screen displayed during import in a case where the import has the possibility of requiring the restart of the image forming apparatus. FIG. 11B shows a screen displayed during import in a case where it is determined during import that the restart of the image forming apparatus is required, when no data categories are shown in a device configuration file as in the FIG. 7 device configuration file.

Figure 11C:
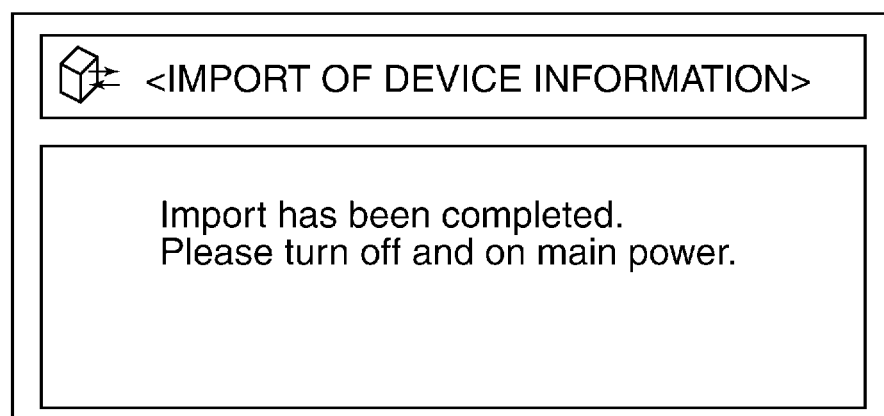

Further, FIG. 11C shows a screen displayed when the import requiring the restart of the image forming apparatus 201 is terminated. Since the restart of the image forming apparatus 201 is required, it is also shown that the main power is required to be turned off and on again.

Figure 12:
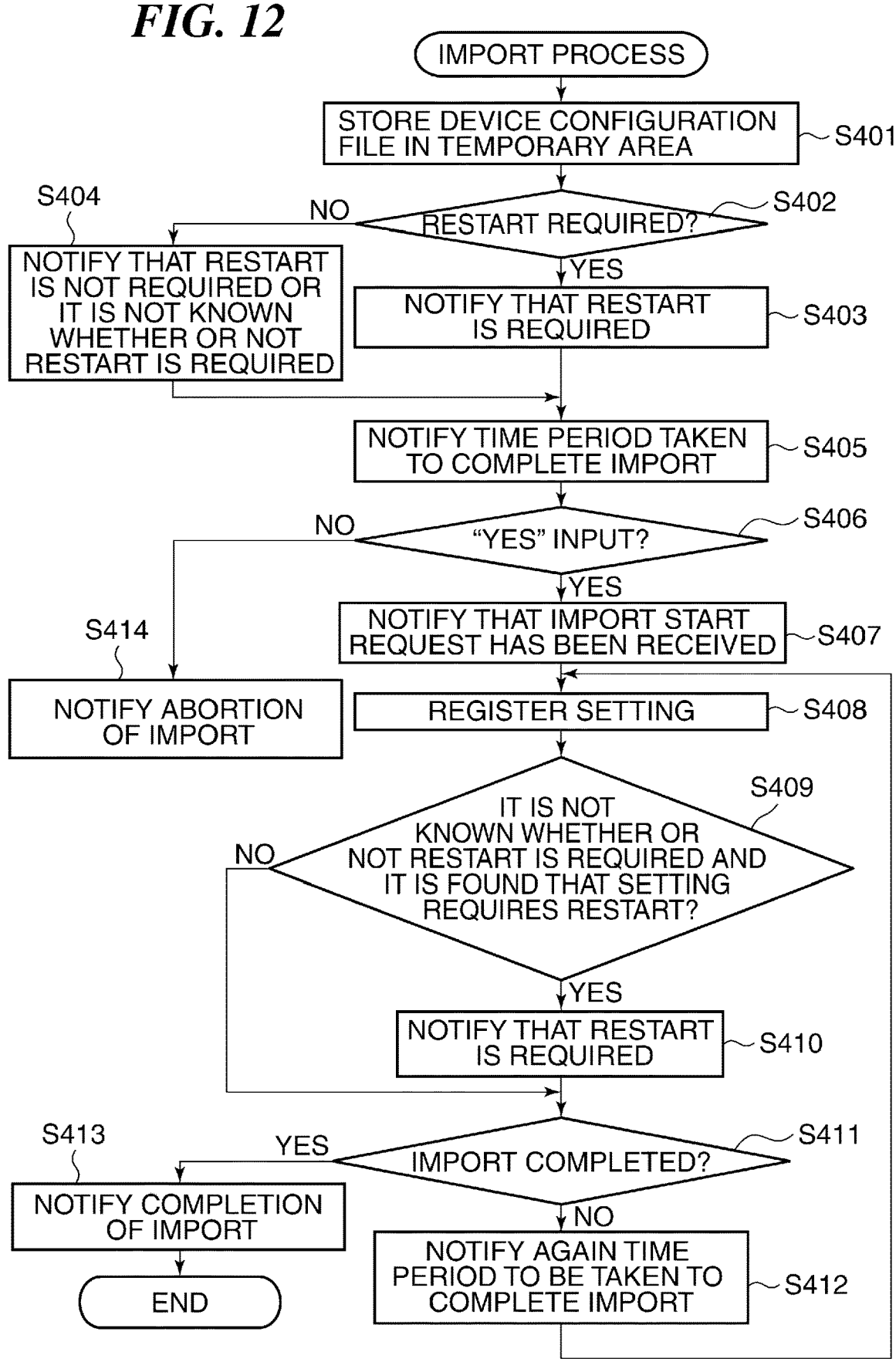
FIG. 12 is a flowchart of an import process performed by a CPU appearing in FIG. 2.

FIG. 12 is a flowchart of the import process performed by the CPU 108 shown in FIG. 2.

Referring to FIG. 12, the network import module 307 of the network import section 305 or the USB import module 312 of the USB import section 330 stores a device configuration file, which is received via the intranet 302 or stored in the USB storage device 208, in the temporary area (step S401). Then, the import management module 309 reads out the device configuration file stored in the temporary area, and determines based on data categories in the device configuration file whether or not the restart of the image forming apparatus 201 is required (step S402).

This step S402 corresponds to the operation of a determination unit configured to determine, before changing the settings of the information processing apparatus based on the configuration file, whether or not the restart of the information processing apparatus is required in order to cause changes of to-be-changed settings specified in the configuration file to take effect, based on categories of the to-be-changed settings and the restart information.

If it is not determined in the step S402 that the restart of the image forming apparatus 201 is required (NO to the step S402), the console section control module 317 and the import service requestor 301 are notified that the restart is not required or it is not known whether or not the restart is required (step S404), and the process proceeds to a step S405.

The case where the answer to the question of the step S402 is negative (NO) includes a case where the to-be-changed settings do not require the restart after the change and a case where no categories are shown in the device configuration file.

In the case where the device configuration file does not show categories to which the to-be-changed settings belong, as described above, the CPU 108 causes the LCD panel 104 to display a notification of the possibility of requiring the restart of the image forming apparatus 201 due to the change of the settings.

On the other hand, if it is determined in the step S402 that the restart of the image forming apparatus 201 is required (YES to the step S402), the console section control module 317 and the import service requestor 301 are notified that the restart is required (step S403).

This step S403 corresponds to the operation of a display unit configured to display results of determination by the determination unit.

Then, a time period to be taken to complete the import is calculated as described with reference to FIGS. 4 to 6, and the calculated time period is notified to the console section control module 317 and the import service requestor 301 (step S405).

Thus, when the restart of the image forming apparatus 201 is not required, the FIG. 9A screen is displayed. Further, when the restart of the image forming apparatus 201 is required, the FIG. 9B screen is displayed. When it is not known whether or not the restart is required, i.e. when there is a possibility of the restart being required, the FIG. 10A screen is displayed.

Next, it is determined whether or not "YES" has been input on the screen shown in FIG. 9A, 9B or 10A (step S406). Although in the illustrated example, it is presupposed that whether or not to start import of the device configuration file is input via the operation section 103, it is also possible to receive a request for starting or aborting the import, from the import service requestor 301, using an apparatus other than the image forming apparatus 201.

If it is determined in the step S406 that "YES" has not been input (NO to the step S406), abortion of the import is notified to the console section control module 317 and the import service requestor 301 (S414), followed by terminating the present process.

On the other hand, if it is determined in the step S406 that "YES" has been input (YES to the step S406), the device configuration file is secondarily stored in the device configuration file database 310, and reception of the request for starting the import is notified to the console section control module 317 (step S407).

Upon receipt of the request, in a case where the restart is required, the console section control module 317 displays the FIG. 10B screen. In a case where there is a possibility of the restart being required, the console section control module 317 displays the FIG. 11A screen.

Then, the device settings import module 314 extracts settings loaded into the device configuration file database 310 one by one, and registers the settings in the device settings database 315 (step S408). Since the settings are registered one by one, the steps S408 to S412 are repeatedly executed until all the settings are registered. This step S408 corresponds to the operation of a changing unit configured to change the to-be-changed settings when an execution instruction has been received from a user via an instruction screen.

Next, it is determined whether or not it is not known from the device settings file that the restart of the image forming apparatus 201 is required and also it is found that the registered setting requires the restart of the image forming apparatus 201 (step S409). As described above, in the step S409, when the device configuration file does not show categories to which the to-be-changed settings belong, it is determined based on other restart information in the settings management information whether or not the settings shown in the device configuration file require the restart of the image forming apparatus 201.

If it is determined in the step S409 that it is known from the device settings file that the restart is required or it is found that the registered setting requires the restart (NO to the step S409), the process proceeds to a step S411.

On the other hand, if it is determined in the step S409 that it is not known from the device settings file that the restart is required and also it is found that the registered setting requires the restart of the image forming apparatus 201 (YES to the step S409), the requirement of the restart is notified to the console section control module 317 (step S410). This causes the FIG. 11B screen to be displayed. Thus, when it is determined that the settings shown in the device configuration file are settings which require the restart of the image forming apparatus 201 after being changed, the CPU 108 causes the LCD panel 104 to display a notification that the changes of the settings require the restart of the image forming apparatus 201.

Then, it is determined whether or not the import has been completed (step S411). As described above, since the settings are registered one by one, it is determined in the step S411 whether or not all the settings have been registered.

If it is determined in the step S411 that the import has not been completed (NO to the step S411), the remaining time period to be taken to complete the import is notified again (step S412), and the process returns to the step S408. The re-notification in the step S412 will be described hereinafter.

On the other hand, if it is determined in the step S411 that the import has been completed (YES to the step S411), the completion of the import is notified to the console section control module 317 and the import service requestor 301 (step S413), followed by terminating the present process. In this case, e.g. when the import requiring the restart has been completed, the FIG. 11C screen is displayed.

When the FIG. 11C screen is displayed, an operation of the user for turning on and off the main power of the image forming apparatus 201 is awaited. However, the image forming apparatus 201 may be automatically rebooted.

Further, the re-notification in the step S412 is performed as follows: For example, in a case where the settings of the data categories of the "address book" and the "department management settings" are to be imported from the FIG. 5 device configuration file, a total import time period is 25 minutes.

When the import of the setting of the data category "address book", which takes 15 minutes, has been completed, the remaining time period is 10 minutes. This time period of 10 minutes is notified in the step S412. Through this notification, the time period to be taken to complete the import, shown in FIG. 10B, is updated. As described above, whenever each setting is changed (step S408), a time period obtained by subtracting a time period indicated in category information of a category to which the changed setting belongs from the total sum of import time periods is displayed on the LCD panel 104 (step S412).

Figure 13:
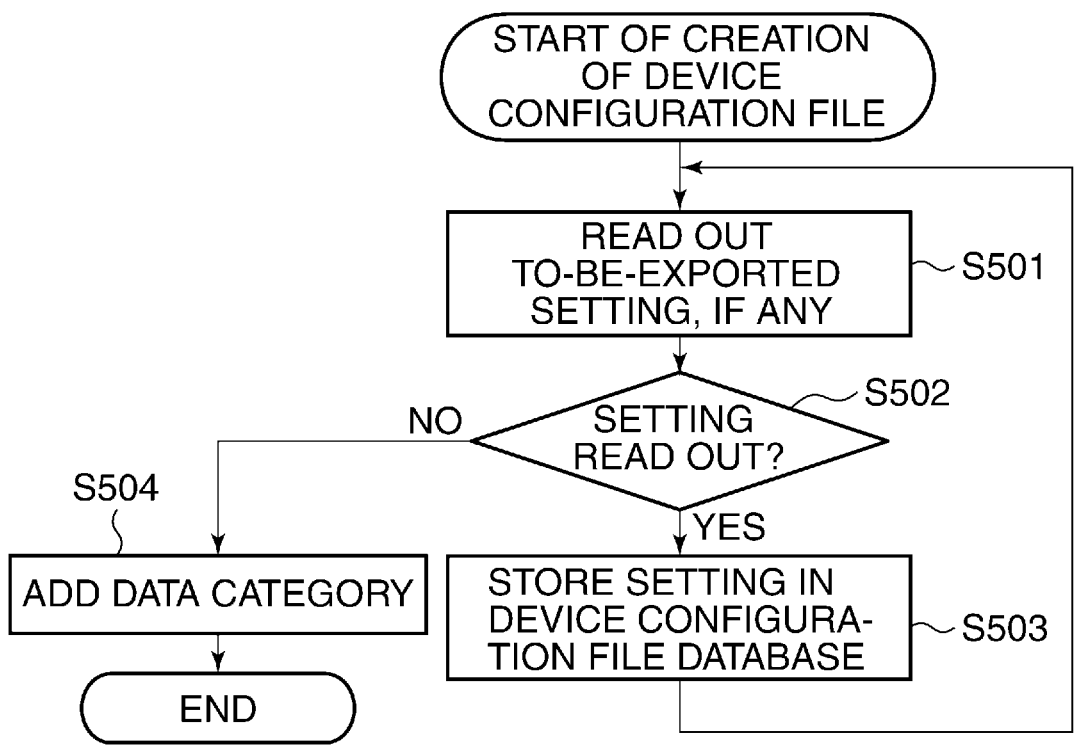
FIG. 13 is a flowchart of an export process performed by the CPU appearing in FIG. 2.

FIG. 13 is a flowchart of the export process performed by the CPU 108 shown in FIG. 2.

Referring to FIG. 13, upon receipt of an export request from the USB import module 312 or the network import module 307, the import service provider 300 reads out settings to be exported, if any, which are managed by the device settings database 315 (step S501). In the illustrated example, the settings are read out one by one.

Then, it is determined whether or not any to-be-exported setting could be read out (step S502).

If it is determined in the step S502 that any to-be-exported setting could be read out (YES to the step S502), the to-be-exported setting is stored in the device configuration file database 310 as a device configuration file in the XML format (step S503), and the CPU 108 returns to the step S501.

On the other hand, if it is determined in the step S502 that no to-be-exported setting could be read out (NO to the step S502), it means that reading of all the settings to be exported has been completed, and hence data categories are added to the device configuration file (step S504), followed by terminating the present process.

The device configuration file created as above is output as an export file to the USB storage device 208 via the USB import module 312, or is transmitted e.g. to the management server 204 of image forming apparatuses via the import service provider 300.

For example, when the FIG. 5 device configuration file is exported, first, all the settings (address 1, address 2, and address 3) belonging to the "address book" are read out one by one, and are stored in the device configuration file.

Then, all the settings belonging to the "department management settings" are similarly read out, and stored in the device configuration file.

With this, since all the settings to be exported are read out and stored in the device configuration file, the data categories are added to "data_category id" within the tag "data_categories", followed by terminating the FIG. 13 export process.

As described above, in the present embodiment, when settings are output to an external device, categories to which the settings belong are output together with the settings.

As described heretofore, in the present embodiment, it is possible to notify the user of requirement of restarting the image forming apparatus, and a time period to be taken to complete import of settings. This makes it possible for the user to use the image forming apparatus in a scheduled manner.

Further, according to the present embodiment, in a case where it is determined that a category shown in a device configuration file requires the restart of the image forming apparatus (YES to the step S402), the notification that a change of a setting requires the restart of the image forming apparatus is caused to be displayed on the LCD panel 104 (step S403). Further, when the user instructs to change the setting via the operation section (YES to the step S406), the setting is changed (step S408). This makes it possible to notify the user of the requirement of the restart of the image forming apparatus in advance, and hence it is possible to improve user-friendliness in changing the settings.

It is to be understood that although in the above-described embodiment, the description has been given of the image forming apparatus as an information processing apparatus, by way of example, the processing and the arrangement based on the intention of the present invention do not use the features of the image forming apparatus, but can be realized by a general information processing apparatus, and therefore the present invention can be applied to a general information processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247631 filed Nov. 29, 2013 which is hereby incorporated by reference herein in its entirety.

What is claimed is:

1. An information processing apparatus comprising:
a display device configured to display information;
an external device connected to the information processing apparatus; and
one or more controllers configured to:
obtain import data which includes settings of a partial of setting items categorizable into a plurality of categories and importable into the information processing apparatus from the external device;
determine, before import of the settings is started into the information processing apparatus, whether a restart of the information processing apparatus is required after the import of the settings into the information processing apparatus;
in a case where it is determined, before the import of the settings is started into the information processing apparatus, that the restart of the information processing apparatus is required, display on the display device, before the import of the settings is started into the information processing apparatus, a message indicating that the restart of the information processing apparatus after the import of the settings is needed and receive an instruction from a user for a start of the import of the settings into the information processing apparatus; and
in a case where it is determined that the restart of the information processing apparatus is not required, receive an instruction from the user for a start of the import of the settings without displaying the message on the display device,
wherein the message displayed on the display device includes an amount of time to be taken to import the settings from the external device from a start of the import of the settings of the partial of setting items into the information processing apparatus to a completion of the import of the settings of the partial of setting items into the information processing apparatus.

2. The information processing apparatus according to claim 1, wherein the plurality of categories includes at least one out of:
address book; favorite settings; system management settings; copy settings; modem settings; sound volume settings; network settings; coin manager settings; IC card reader settings; department management settings; scanner device settings; and printer device settings.

3. The information processing apparatus according to claim 1, wherein the setting items importable into the information processing apparatus include at least one out of:
device name;
device installation location;
power saving settings;
destination;
user settings;
copy standard mode;
FAX reception mode;
NCU settings;
panel sound volume;
IP address settings;
coin device mode;
card reader read settings;
department;
engine electrostatic voltage adjustment;
engine density adjustment;
document size detection settings;
document feeding speed correction; and
CCD lamp adjustment.

4. The information processing apparatus according to claim 1, further comprising an interface via which information can be input, wherein the import data is input via the interface.

5. The information processing apparatus according to claim 4, wherein the interface is a network interface.

6. The information processing apparatus according to claim 4, wherein the interface is a USB interface.

7. The information processing apparatus according to claim 1, further comprising an image forming device configured to form an image on a sheet.

8. The information processing apparatus according to claim 1, further comprising a reading device configured to read an original.

9. The information processing apparatus according to claim 1, wherein the one or more controllers are further configured to:
display, on the display device, another message prompting the user to input an operation for restarting the information processing apparatus.

10. The information processing apparatus according to claim 1, wherein the one or more controllers are further configured to:
obtain a list of data categories associated with an import time period.

11. The information processing apparatus according to claim 1,
wherein it is determined that the restart of the information processing apparatus is required in a case where the obtained import data includes the settings which belongs to the category including at least one setting item which requires the restart of the information processing apparatus.

12. A method of controlling an information processing apparatus, that has one or more controllers and a display device which displays information, the method comprising:
obtaining, by the one or more controllers, import data which includes settings of a partial of setting items categorizable into a plurality of categories and importable into the information processing apparatus from an external device connected to the information processing apparatus:
determining, by the one or more controllers, before import of the settings is started into the information processing apparatus, whether a restart of the information processing apparatus is required after the import of the settings into the information processing apparatus;
in a case where it is determined, before the import of the settings is started into the information processing apparatus, that the restart of the information processing apparatus is required, displaying on the display device, before the import of the settings is started into the information processing apparatus, a message indicating that the restart of the information processing apparatus after the import of the settings is needed and receiving an instruction from a user for a start of the import of the settings from the external device; and
in a case where it is determined that the restart of the information processing apparatus is not required, receiving an instruction from the user for a start of the import of the settings from the external device without displaying the message on the display device,
wherein the message displayed on the display device includes an amount of time to be taken to import the settings from the external device from a start of the import of the settings of the partial of setting items into the information processing apparatus to a completion of the import of the settings of the partial of setting items into the information processing apparatus.

13. A non-transitory computer-readable storage medium storing a computer-executable program for executing a method of controlling an information processing apparatus that has one or more controllers and a display device which displays information, the method comprising:
- obtaining, by the one or more controllers, import data which includes settings of a partial of setting items categorizable into a plurality of categories and importable into the information processing apparatus from an external device connected to the information processing apparatus;
- determining, by the one or more controllers, before import of the settings is started into the information processing apparatus, whether a restart of the information processing apparatus is required after the import of the settings into the information processing apparatus;
- in a case where it is determined, before the import of the settings is started into the information processing apparatus, that the restart of the information processing apparatus is required, displaying on the display device, before the import of the settings is started into the information processing apparatus, a message indicating that the restart of the information processing apparatus after the import of the settings is needed and receiving an instruction from a user for a start of the import of the settings from the external device; and
- in a case where it is determined that the restart of the information processing apparatus is not required, receiving an instruction from the user for a start of the import of the settings from the external device without displaying the message on the display device,
- wherein the message displayed on the display device includes an amount of time to be taken to import the settings from the external device from a start of the import of the settings of the partial of setting items into the information processing apparatus to a completion of the import of the settings of the partial of setting items into the information processing apparatus.

* * * * *